United States Patent
Iliev

(10) Patent No.: US 12,455,183 B2
(45) Date of Patent: Oct. 28, 2025

(54) COST EFFECTIVE PRESSURE SENSORS FOR GAS METERS

(71) Applicant: Itron Global SARL, Liberty Lake, WA (US)

(72) Inventor: George Iliev, Wissembourg (FR)

(73) Assignee: Itron Global SARL, Liberty Lake, WA (US)

( * ) Notice: Subject to any disclaimer, the term of this patent is extended or adjusted under 35 U.S.C. 154(b) by 839 days.

(21) Appl. No.: 17/395,287

(22) Filed: Aug. 5, 2021

(65) Prior Publication Data
US 2023/0041634 A1  Feb. 9, 2023

(51) Int. Cl.
| | |
|---|---|
| G01F 15/10 | (2006.01) |
| G01D 4/00 | (2006.01) |
| G01F 1/20 | (2006.01) |
| G01F 1/50 | (2006.01) |

(52) U.S. Cl.
CPC ............. *G01F 15/10* (2013.01); *G01D 4/002* (2013.01); *G01F 1/206* (2013.01); *G01F 1/50* (2013.01)

(58) Field of Classification Search
CPC ........... G01D 4/002; G01F 1/206; G01F 1/50; G01F 15/002; G01F 15/007; G01F 15/10
See application file for complete search history.

(56) References Cited

U.S. PATENT DOCUMENTS

| | | | |
|---|---|---|---|
| 5,335,553 A | 8/1994 | Ueki et al. | |
| 9,109,935 B2 | 8/2015 | Yang et al. | |
| 2002/0195105 A1* | 12/2002 | Blue | A61M 16/024 128/205.25 |
| 2009/0227906 A1* | 9/2009 | Oster | A61B 5/224 600/587 |
| 2010/0102258 A1* | 4/2010 | Naganuma | G01F 15/007 251/129.01 |
| 2016/0325057 A1* | 11/2016 | Morrison | A61M 15/0071 |
| 2017/0259698 A1* | 9/2017 | Cuddihy | B60N 2/003 |
| 2018/0088599 A1* | 3/2018 | Iliev | H04Q 9/00 |
| 2021/0255021 A1* | 8/2021 | Pennebaker, III | G01F 23/14 |

FOREIGN PATENT DOCUMENTS

| | | |
|---|---|---|
| CA | 3119097 | 4/2020 |
| CN | 213632255 | 7/2021 |
| EA | 018169 B1 | 6/2013 |

(Continued)

OTHER PUBLICATIONS

CN-110836699—English Translation (Year: 2021).*

(Continued)

*Primary Examiner* — Michael J Dalbo
(74) *Attorney, Agent, or Firm* — Lee & Hayes, P.C.

(57) ABSTRACT

Cost effective pressure sensors for gas meters are described herein. In an example, responsive to an abnormal condition at an ultrasonic metrology unit of a gas meter, rates of pressure sensor operation are increased. In the example, the operations may include: measuring gas-environment pressure values; measuring contemporaneous air-environment pressure values; calculating pressure difference values of the gas-environment pressure values minus the contemporaneous air-environment pressure values; and comparing pressure difference values to one or more threshold values.

23 Claims, 8 Drawing Sheets

(56) References Cited

FOREIGN PATENT DOCUMENTS

JP      2007187525 A    7/2007
WO   WO2018058074 A1   3/2018

OTHER PUBLICATIONS

JP-2020094964—English Translation (Year: 2020).*
CN-211951607—English Translation (Year: 2020).*
JP-2004144641—English Translation (Year: 2004).*
Honeywell American Meter AC-250 Nxs System, Smart Gas Metering System, Honeywell Smart Energy, 2020 Honeywell International Inc., 4 pages.
The PCT Search Report and Written Opinion mailed Sep. 22, 2022 for PCT application No. PCT/US2022/031642, 52 pages.
Examination Report for Australian Application No. 2022323938, Dated Sep. 25, 2024, 3 pages.
Office Action for Canadian Application No. 3,224,465, Dated Feb. 25, 2025, 3 pages.
Office Action for Korean Application No. 10-2024-7003746, Dated May 26, 2025, 15 pages.

\* cited by examiner

COST EFFECTIVE PRESSURE SENSORS FOR GAS METERS

BACKGROUND

Gas meters (e.g., meters measuring gas provided by a utility company to residential and commercial customers) provide more information than was previously possible. However, the new gas meters have failed to provide—and/or have failed to provide at reasonable cost—rapid automatic shutoff on high pressure, alarm on low pressure or in response to tampering with the gas meter, and/or a readout of instantaneous gas pressure.

Cost-effective solutions to provide greater functionality and lower cost would be welcome.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

DETAILED DESCRIPTION

Overview

Figure 1:
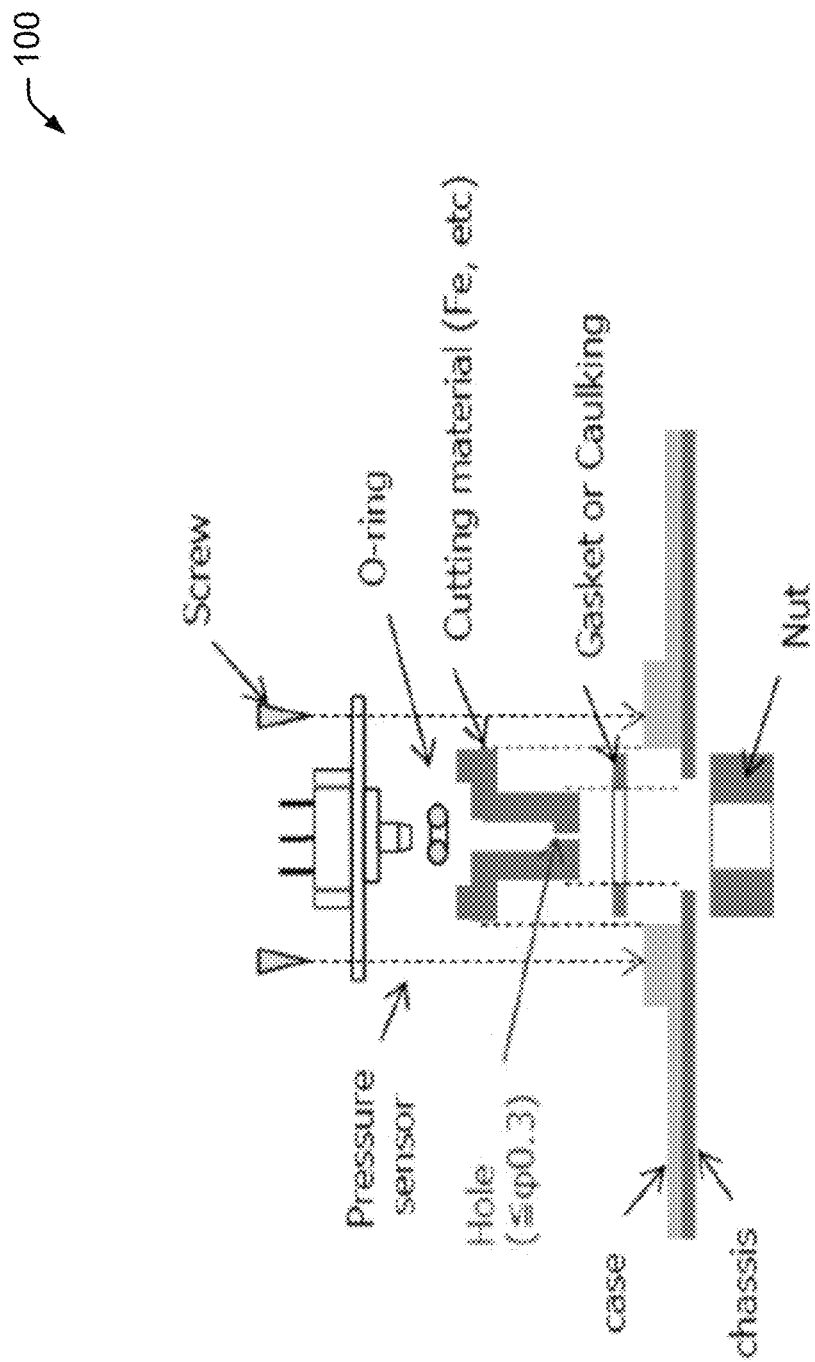
FIG. 1 is an exploded diagram showing an example of a known gas pressure sensor, and its installation in a portion of an enclosure of a gas meter.

FIG. 1 shows an example of a known gas pressure sensor 100 and its installation in a portion of an enclosure of a gas meter. In the example shown, the pressure sensor is installed into the enclosure (e.g., including the chassis and case) through which a hole has been drilled. In addition to requiring a drilled hole, the sensor includes a number of auxiliary components (e.g., the O-ring, gasket, screws, etc.) and must be installed in a gas-tight manner. Accordingly, the process is somewhat expensive.

To reduce costs and to increase the functional abilities of the gas meter, an improved sensor configuration and data collection, processing and utilization techniques are described. In an example, two sensors are installed in the gas meter. The sensors may be micro electrical mechanical systems (MEMS). In the example, a first sensor is installed (e.g., by an automated assembly process) on a metrology-in-gas (MIG) printed circuit board assembly (PCBA) that is within a gas-environment of the gas meter. Accordingly, the first sensor is configured to measure gas pressure within the gas-environment. The gas-environment is a part of the gas meter that receives incoming gas from a utility company pipe and that exhausts outgoing gas into a pipe that provides gas to a utility customer's site. A metrology device or flow measuring unit (FMU) (e.g., an ultrasonic metrology unit (UMU)) is located at least in part in the gas-environment.

In the example, a second MEMS pressure sensor is installed (e.g., by an automated assembly process) on an index PCBA located in an air-environment of the gas meter. The index PCBA may include a processor and memory, and may be configured to receive gas consumption data and gas pressure data from the FMU and/or one or more MIG PCBA or sensor devices.

A processor and a memory device accessible by the processor are typically located on the index PCBA. Programming and/or commands stored in the memory device and executable by the processor are configured to perform operations that process the incoming pressure data from the first and second sensors. In an example, the processor calculates a pressure difference value as the gas pressure value (i.e., the pressure inside the gas-environment of the gas meter) minus the air pressure value (i.e., the barometric or atmospheric pressure in the air-environment of the gas meter).

Under some conditions, the pressure difference value may be approximately equal to a column of 7 inches of water. The pressure difference value may be compared to an upper threshold value and/or a lower threshold value. If the pressure difference value is greater than the upper threshold value, an over-gas-pressure event may be reported. If the pressure difference value is less than the lower threshold value, an under-gas-pressure event may be reported. If the pressure difference value is greater than an extreme upper threshold value (e.g., "emergency threshold value"), the processor may issue signals and/or commands to perform an immediate gas-supply valve shutoff. The immediate shutoff will close the valve that allows gas into the gas meter. The immediate shutoff may prevent very high gas pressure from overwhelming the gas meter, customer gas pipes and/or appliances, and creating an explosive and life-threatening situation.

Gas meters are typically battery powered. In an example product requirement specification, the batteries must last for 20 years. Accordingly, managing the input from the first and second pressure sensors may be a burden on the electronics of the gas meter, and may compromise the product requirement specification. In examples discussed in this document, a flow measuring unit (FMU) may be configured as an ultrasonic metrology unit (UMU) or other device according to design requirements. If indicated by conditions, the FMU sends information showing an abnormal condition and/or signal-gain or signal-gain variability at the FMU. If the FMU sends an abnormal signal (and/or the signal-gain unit exceeds a threshold value) then the processor may begin to calculate the pressure difference value or begin to calculate the pressure difference value at a higher rate. In an example, a pressure increase may affect a signal sent by the FMU, and the changed signal may be used to trigger a quick, immediate and/or increased rate of pressure read(s) (i.e., the gathering of pressure sensor input). The higher rate may include more frequent pressure measurements in the gas-environment and the air-environment, more frequent calculations of the pressure difference value using the measurements, and more frequent comparisons of the pressure difference value to one or more threshold values (e.g., an under-pressure threshold, an over-pressure threshold, and an emergency over-pressure threshold). The abnormal condition, if in excess of a threshold value, may trigger an immediate response to close a valve and block incoming gas.

Example Systems and Techniques

Figure 2:
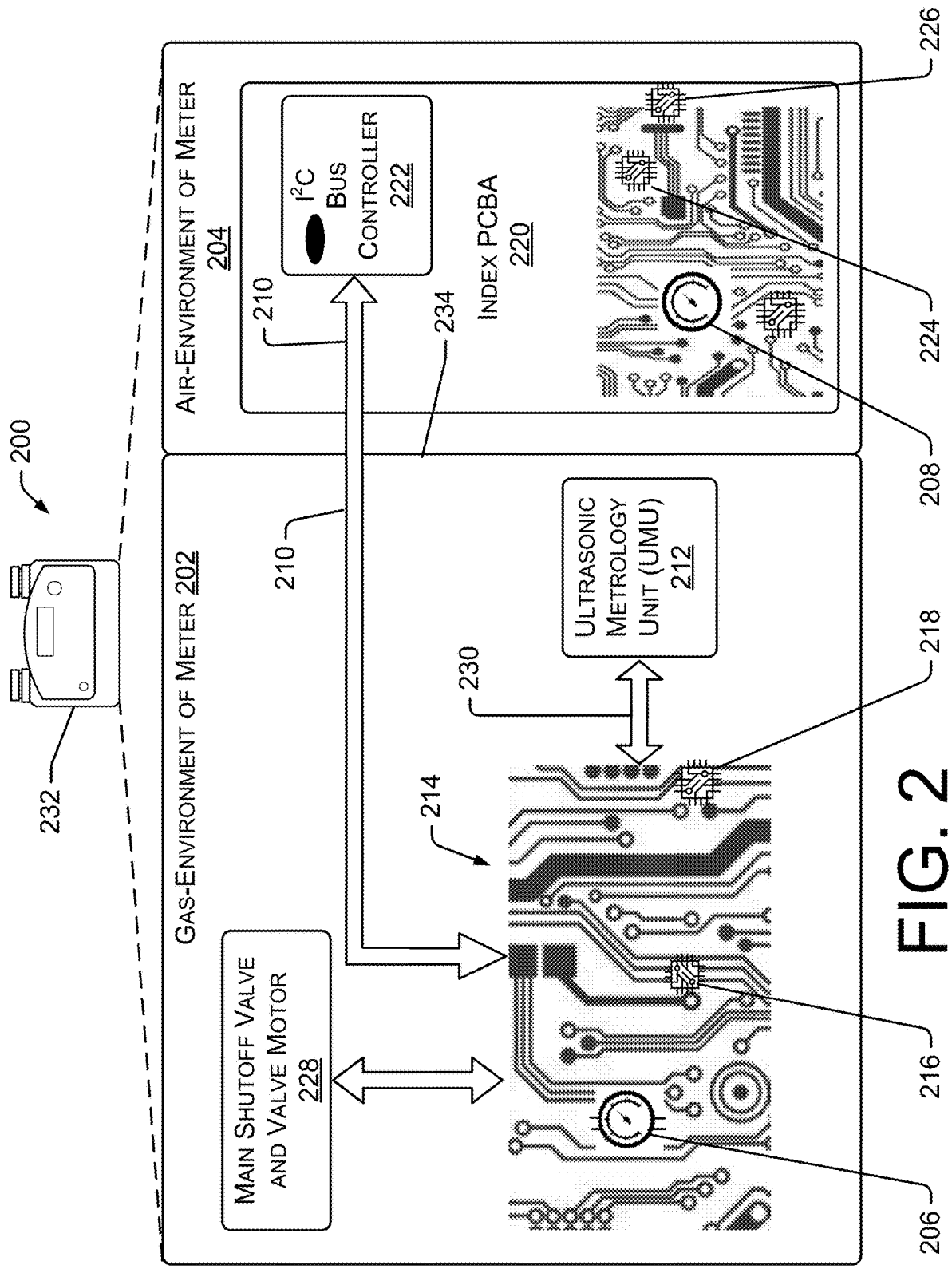
FIG. 2 is a block diagram showing an example gas meter having pressure sensors in both a gas-environment and an air-environment of the gas meter.

FIG. 2 shows an example gas meter 200 having a gas-environment 202 and an air-environment 204. In the example shown, a gas pressure sensor 206 is located in the gas-environment and an air pressure sensor 208 is located in the air-environment of the gas meter.

The gas-environment 202 receives natural gas from an incoming or input gas pipe, such as from a gas utility company. The gas-environment 202 exhausts gas into an outgoing or output pipe, which is attached to a pipe delivering gas to a customer (e.g., a residence, commercial or industrial site, etc.). Within the gas environment 202 is a portion of a bus 210 (e.g., a I²C bus) that is continued into the air-environment 204. A metrology device 212 (e.g., a flow measuring unit (FMU) such as an ultrasonic metrology unit (UMU)) is at least partially located within the gas-environment 202. One or more metrology-in-gas (MIG) PCBAs 214 may be configured for operation within the gas-environment 202. Each MIG PCBA may be configured to operate one or more devices, such as a valve, valve motor, sensor, switch, etc. In an example, a main gas shutoff valve 228 and valve motor 228 is controlled by the MIG PCBA 214. The main gas shutoff valve 228 prevents gas from entering the gas meter 200 from a supply pipe of the gas utility company. In the example shown, a pressure sensor, a motor and the UMU are connected to, and operated by, the same MIG PCBA, which is attached to the bus 210. However, different MIG PCBA(s) may be used to operate one or more of the motor, pressure sensor and FMU, with each MIG PCBA attached to the bus 210.

In the example shown, the MIG PCBA 214 may control the operation of the first gas pressure sensor 206. In the example, a processor 216 is configured to execute commands (e.g., programming statements) defined or contained in a memory device 218. In an example, the processor 216 may communicate over a direct connection with the FMU 212 in the gas-environment. The processor 216 may communicate with the index PCBA 220, located within the air-environment 204, over the bus 210.

The air-environment 204 of the gas meter 200 is separated from the gas-environment 202 by portions 234 of the enclosure 232 of the gas meter 200. Accordingly, gas is not able to enter the air-environment (and vice versa).

In the example of FIG. 2, an index PCBA 220 is in communication with devices of the gas-environment 202 and the air-environment 204 using the bus 210, which may be controlled by the I²C bus controller 222. The index PCBA 220 may be configured to receive gas consumption data from a MIG PCBA 214 configured to control the FMU. In an example, data may be transferred between the MIG PCBA 214 and the FMU 212 by a direct connection 230, or in alternative designs over the bus 210. Accordingly, the FMU 212 may be connected to the bus 210 through the MIG PCBA 214 or could be directly connected to the bus if the MIG PCBA is not utilized and/or present.

The index PCBA 220 may include a second gas pressure sensor (air pressure sensor 208), which may be MEMS device that is mounted to the printed circuit or wiring board in an automated manner during the manufacturing process. Also present on the index PCBA 220 are a processor 224 and associated memory device 226. The memory device 226 is configured to contain commands (e.g., programming statements) that allow the processor 224 to receive, process and transmit gas consumption data.

The memory device 226 is also configured to contain commands that enable the processor to process data from the gas pressure sensor 206 in the gas-environment 202 and the air (barometric) pressure sensor 208 in the air-environment 204. In some examples, the processor 224 may utilize techniques described in FIGS. 3-9 to process and utilize the pressure data. In such examples, the sensor data may include a pair of pressure values, including a gas pressure value (measured by MEMS sensor 206 in the gas-environment) and an air (barometric) pressure value (measured by the MEMS sensor 208 in the air-environment).

By executing programming commands contained within the memory device 226, the processor calculates a pressure difference value. In an example, the pressure difference value is the gas-pressure value minus the air-pressure value. In an example of normal operation, the gas pressure may be greater than the air pressure value by the equivalent of approximately 7 inches of water (e.g., approximately 1 or 2 psi). If the gas or air pressure is unusual (e.g., high gas pressure due to malfunction) then the pressure difference value may be greater or lower. In the case of barometric pressure variation (e.g. a storm, which may lower barometric pressure), a pressure regulator of a gas meter regulates the gas pressure with respect to the atmospheric (i.e., barometric) pressure. Accordingly, in storm conditions, the difference in pressure between the gas and the barometric pressures may not change (e.g., both go lower). However, if barometric pressure is also measured (in addition to gas pressure) the low gas and barometric pressures may be recognized. In one example (e.g., a gas leak), the gas pressure value may be low, and the pressure difference may be lower. In another example (e.g., gas overpressure), the gas pressure value may be very high, and the pressure difference may be greater.

The pressure difference value may be compared to one or more threshold values. If the pressure difference value is greater than a first threshold value, it may indicate gas overpressure, and this should be reported, since overpressure events may require gas valve closure and/or more rapid sensor measurements and data calculations.

If the pressure difference is greater than a second threshold value (larger than the first threshold value) the processor 224 may send an immediate command to shut a gas valve to prevent gas from entering the gas meter, and by extension, to prevent gas from entering the gas system (pipes, appliances, etc.) of the customer.

If the pressure difference is less than a third threshold value (smaller than the first threshold value), that may indicate a gas under-pressure event, which should be reported.

In a situation wherein a customer has tampered with a gas meter, a threshold may be compared to the pressure difference (pressure of the gas minus barometric (atmospheric) pressure). In the event that the comparison indicates customer-tampering, a tamper alarm or signal is sent.

Figure 3:
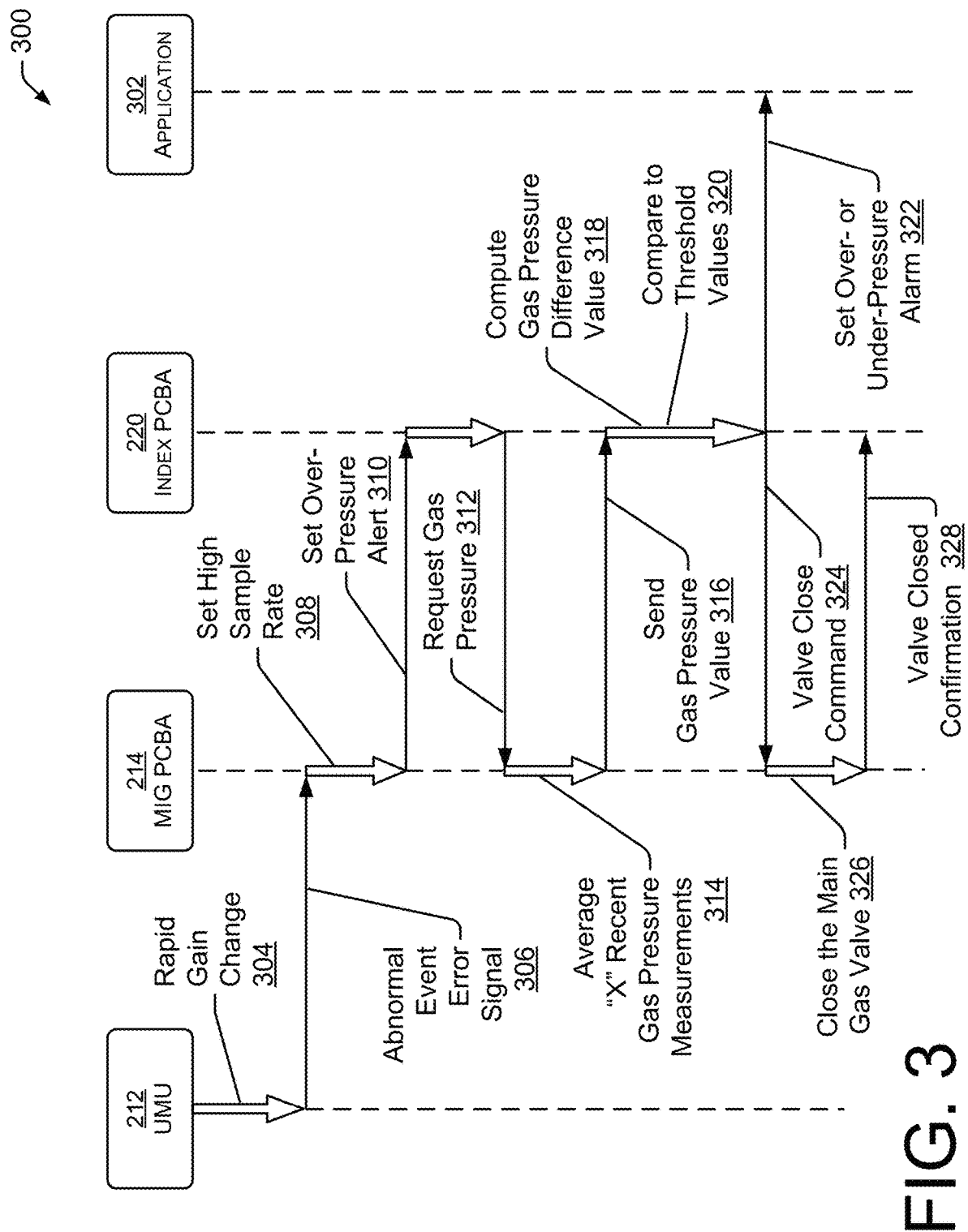
FIG. 3 is a sequence and timing diagram showing an example sequence of events and activities on a flow measuring unit (FMU), a metrology-in-gas printed circuit board assembly (PCBA), an index PCBA, and a (possibly remotely located) software application.

FIG. 3 shows an example sequence 300 and relationship of events, actions, operations and/or activities 304-328 on an FMU 212, a metrology-in-gas (MIG) printed circuit board assembly (PCBA) 214, an index PCBA 220, and a software application 302.

Action, operation and/or event 304 is a rapid gain change at the FMU 212. The rapid gain change—up or down—may be indicated by a change in the pressure difference (i.e., pressure of the gas minus barometric (atmospheric) pressure). The rapid gain change and/or measured flowrate may result from a rapid change in the gas pressure within the gas-environment of the gas meter. The rapid change in gain may be a rapid increase in gas pressure, such as if a large quantity of gas suddenly—and possibly, accidentally—came online. This may result from accidental valve operation upstream, a gas compressor failure, mistaken addition of portable gas supplies (e.g., a truck supplying gas to supplement typical pipeline operation), etc. Conversely, the rapid change in gain may result from a rapid decrease in gas pressure, such as that caused by a leak or broken pipe.

At action, operation and/or event 306, an abnormal event signal or message is sent from the FMU 212 to the MIG PCBA 214. The abnormal event is sent in response to the rapid gain change situation of action 304. While the example of FIG. 3 shows the abnormal event signal being sent to the MIG PCBA 214, an alternative design would allow the signal to be sent directly to the index PCBA 220.

At action, operation and/or event 308, the sample rate (performed by the gas pressure sensor 206 in the gas-environment and the air pressure sensor 208 in the air-environment) is increased. In some example designs, the sample rate is low until an abnormal event, while in other example designs, the sample rate is zero until an abnormal event.

At action, operation and/or event 310, an over pressure alert is sent from the MIG PCBA 214 to the index PCBA 220.

At action, operation and/or event 312, the index PCBA 220 sends the MIG PCBA 214 a request for gas pressure.

At action, operation and/or event 314, the MIG PCBA 214 averages a number of recent gas-pressure measurements. The number averaged can vary, and may depend on performance characteristics of the gas pressure and barometric pressure sensors. The number averaged may also depend on settings of over/under pressure threshold settings. In an example, a difference between the threshold settings from the gas operating pressure may be used in a determination of the number of recent gas-pressure measurement to average.

At action, operation and/or event 316, having averaged recent gas-pressure measurements, the MIG PCBA 214 sends the averaged gas pressure value to the index PCBA 220.

At action, operation and/or event 318, the index PCBA 220 has in memory device 226 the gas-pressure value received from the MIG PCBA and an atmospheric (barometric) air-pressure value from the air pressure sensor 208. Using these pressure values, the index PCBA can calculate pressure difference according to: pressure difference equals the gas-pressure value (e.g., as measured by gas pressure sensor 206) minus the air-pressure value (e.g., as measured by air pressure sensor 208).

At action, operation and/or event 320, the pressure difference value is compared to one or more threshold values. If the pressure difference value fails to exceed a first threshold, then a low gas pressure situation is indicated. If the pressure difference exceeds a second threshold (but is less than a third threshold), then a high gas pressure situation is indicated. If the pressure difference value exceeds the third threshold, then a very high gas pressure situation is indicated, and the gas shutoff valve 228 must immediately be closed.

At action, operation and/or event 322, in response to the difference value being less than the first threshold, a low-pressure alarm, message or signal is sent. In response to the difference value being greater than the second threshold, a high-pressure alarm, message or signal is sent. The under-pressure or over-pressure alarms are sent from the index PCBA 220 to a remote application, such as system management software on a remote server, headend and/or main office of a utility company.

At action, operation and/or event 324, responsive to the third threshold being exceeded, a command to close the main gas valve is sent from the index PCBA 220 to the MIG PCBA 214. At action, operation and/or event 326, the MIG PCBA uses an appropriate command, signal, or software routine to activate a motor to close the main gas valve 228. At action, operation and/or event 328 the MIG PCBA sends a confirmation signal or message indicating that the main gas valve was closed.

Example Methods

In some examples of the techniques discussed herein, the methods of operation may be performed by one or more application specific integrated circuits (ASIC) or may be performed by a general-purpose processor utilizing software defined in computer readable media. In the examples and techniques discussed herein, the memory 218 and/or 226 may comprise computer-readable media and may take the form of volatile memory, such as random-access memory (RAM) and/or non-volatile memory, such as read only memory (ROM) or flash RAM. Computer-readable media devices include volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device.

As defined herein, computer-readable media does not include transitory media, such as modulated data signals and carrier waves, and/or signals.

Figure 4:
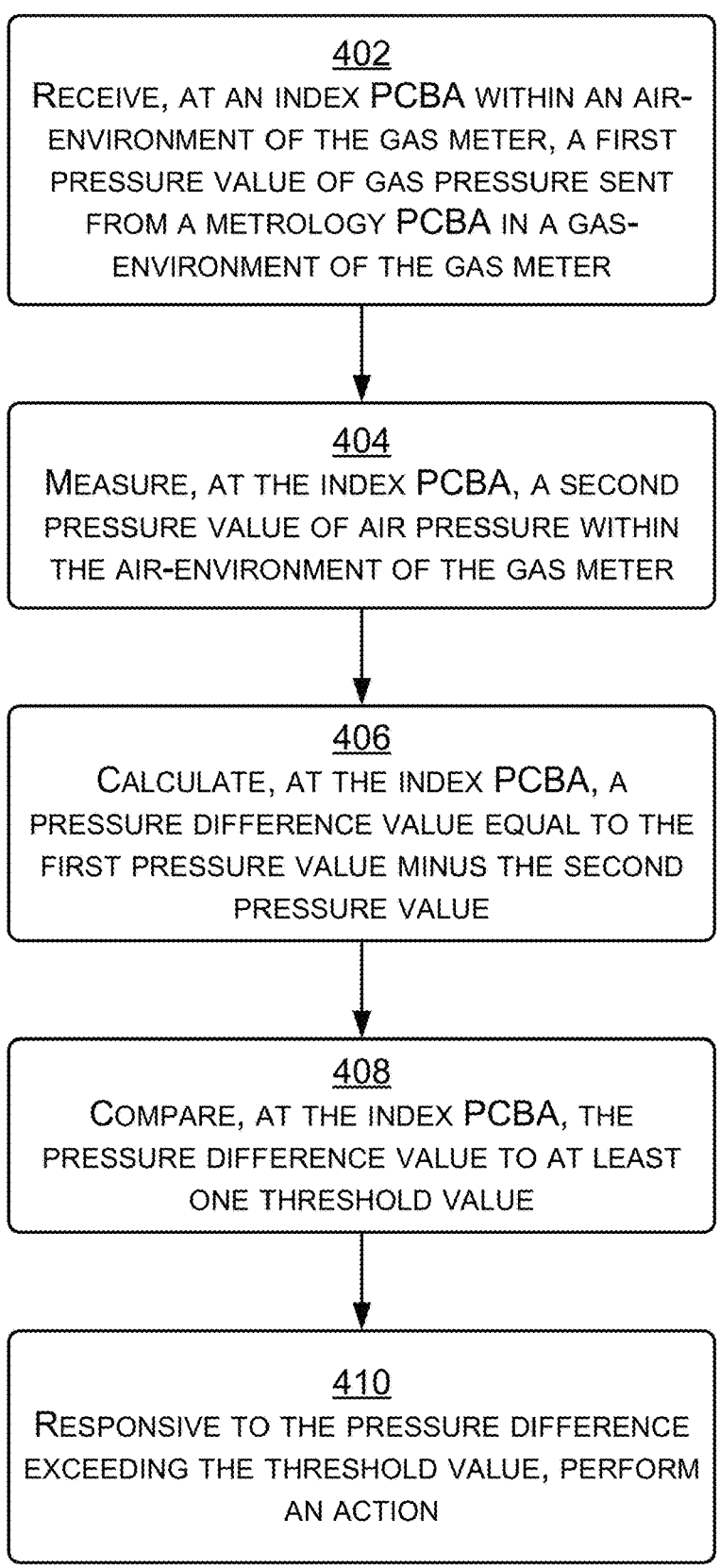
FIG. 4 is a flow diagram showing example gas meter operation, wherein measurement values of a pressure within a gas-environment and an air-environment are processed.

FIG. 4 shows example gas meter operation 400, wherein measurement values of a pressure within a gas-environment and an air-environment are processed.

At block 402, an index PCBA, within an air-environment of the gas meter, receives a first pressure value. The first pressure value indicates gas pressure within the gas-environment of the gas meter. In the example of FIG. 2, the first pressure value may have been measured by the sensor 206 in the gas-environment. The first pressure value may be sent from the metrology PCBA 214 to the index PCBA 220 over the communications bus 210.

At block 404, the index PCBA measures a second pressure value. The second pressure value indicates air or barometric pressure within the air-environment of the gas meter. In the example of FIG. 2, the second pressure value may have been measured by the sensor 208 of the index PCBA 220, and indicates the air pressure and/or barometric pressure within the air-environment 204 of the gas meter.

At block 406, a pressure difference value is calculated to be equal to the first pressure value minus the second pressure value. In the example of FIG. 1, the calculation is performed at the index PCBA 220.

At block 408, the pressure difference value is compared to a threshold value. In the example of FIG. 2, the comparison is performed by the processor 224 executing commands obtained from the memory device 226 of the index PCBA 220.

Figure 5:
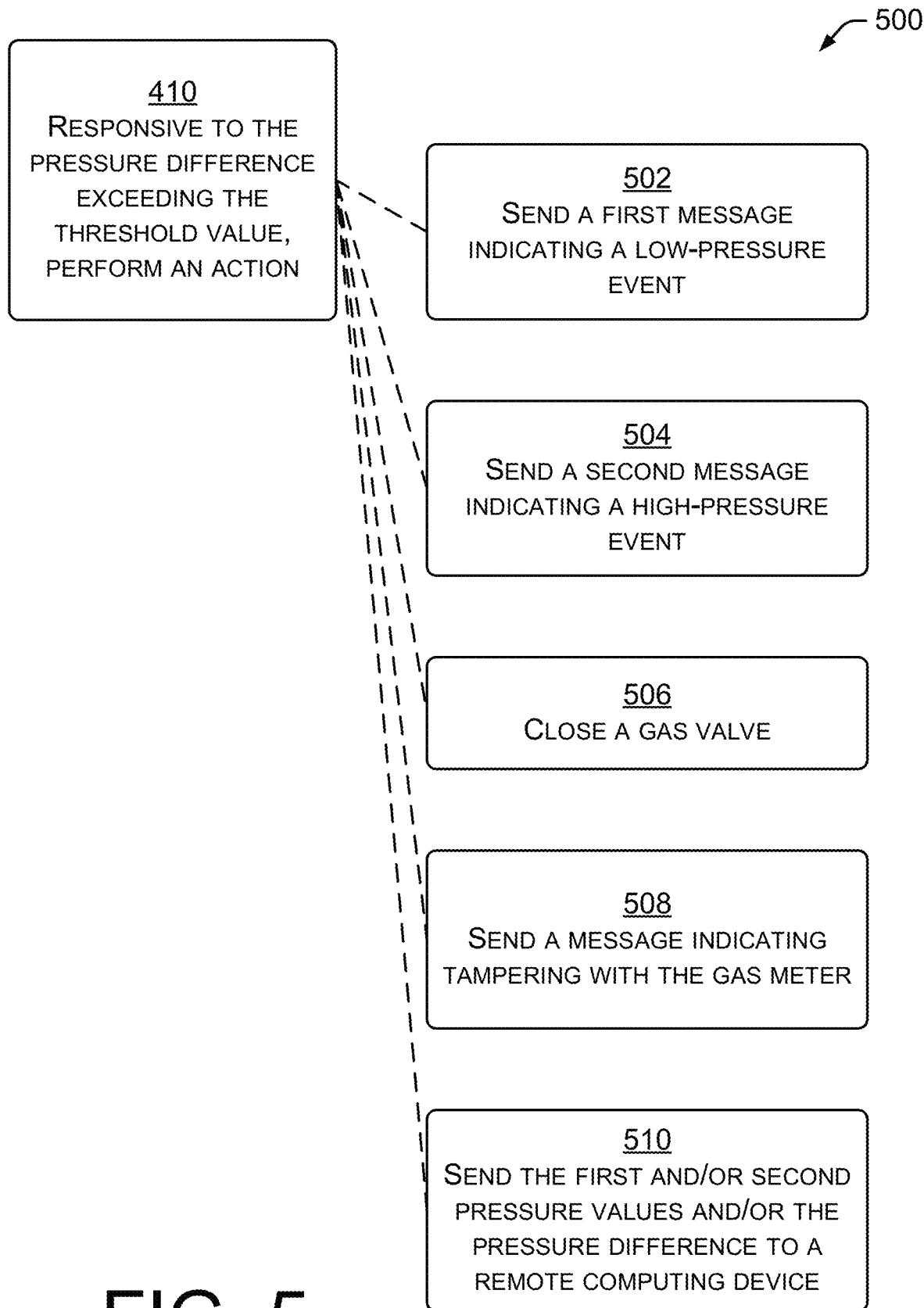
FIG. 5 is a flow diagram showing example gas meter operation, wherein the gas-environment pressure minus the air-environment pressure exceeds a threshold value.

At block 410, an action is performed if, and/or responsive to, a relationship between the pressure difference value and one or more threshold values. In an example, the pressure difference value may have one or more relationships with one or more threshold values (e.g., less than a first threshold or greater than a second threshold). FIG. 5 shows five example actions that may be performed.

At block 502, a first message indicating a low-pressure event may be sent. In this example, a pressure difference value less than a first threshold value indicates a low gas pressure event. The example of block 322 of FIG. 3 shows how a message may be sent from the index PCBA to a headend office, server, application 302, etc.

At block 504, a second message may be sent indicating a high-pressure event. In this example, a pressure difference value greater than a second threshold value indicates a high gas pressure event. In the example of block 322 of FIG. 3, a message is sent from the index PCBA to a headend office, server, application 302, etc.

At block 506, a gas valve is closed. In this example, a pressure difference value greater than a third threshold value indicates an emergency high gas pressure event. In an example of block 324 of FIG. 3, the valve close command 324, the closing the main valve action 326, and the valve closed confirmation 328 are an example of actions taken at block 506.

At block 508, a message indicating tampering with the gas meter may be sent. In an example, the message is sent to a headend device, such as a utility company server, main office computing center, etc.

At block 510, the first and/or second pressure value and/or the pressure difference may be sent to a remote computing device. In an example, these values may be sent for purposes of data analytics.

Figure 6:
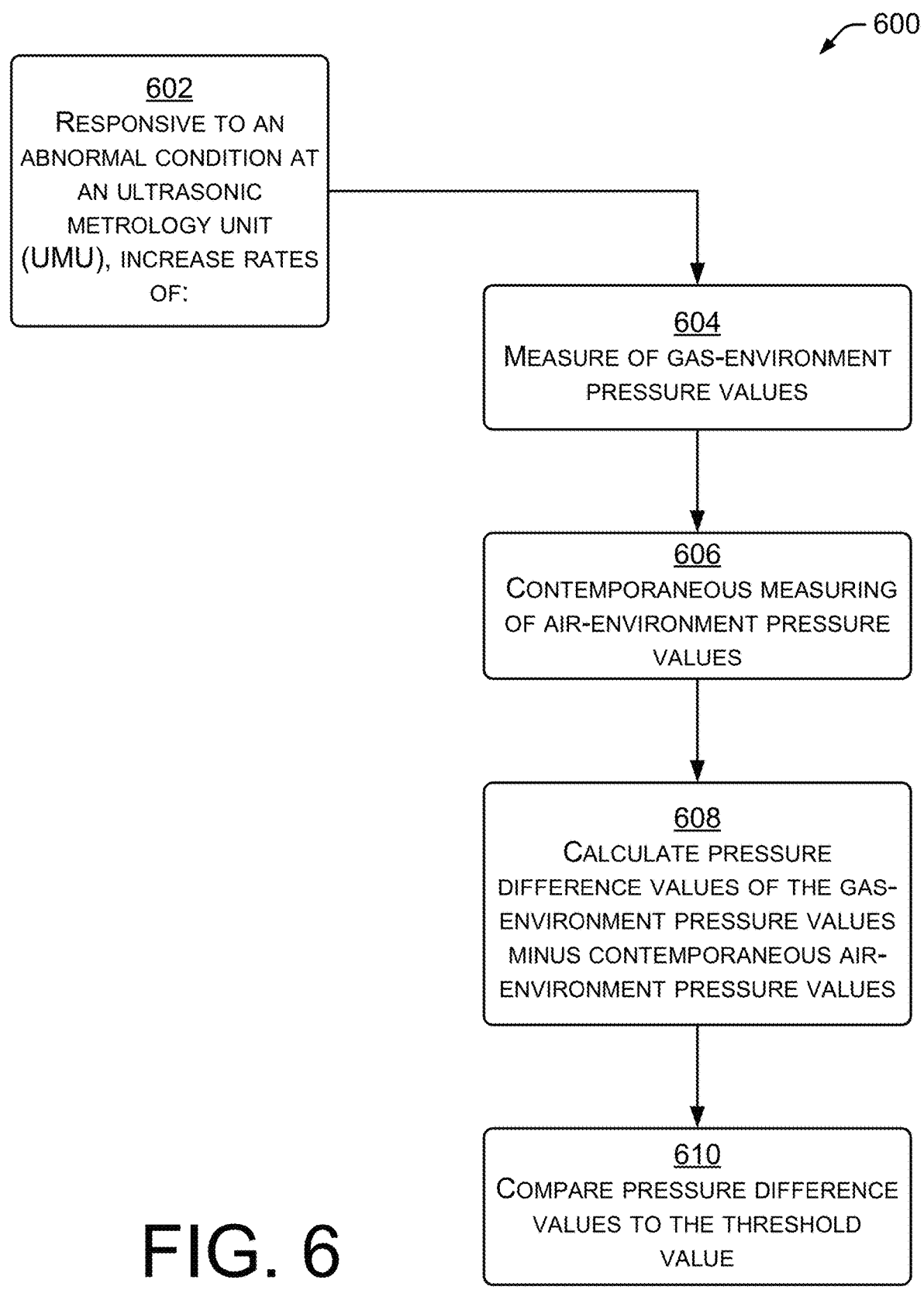
FIG. 6 is a flow diagram showing example gas meter operation responsive to an abnormal condition at an FMU.

FIG. 6 shows example gas meter operation 600 responsive to an abnormal condition at a flow measuring unit (FMU). To save power, measurements of pressure in the gas-environment and in the air-environment may be performed at a low rate (or possibly not at all) until an abnormal condition is detected.

At block 602, in response to an abnormal condition at the FMU, a rate of one or more actions may be increased or, if the actions are not currently being performed, then the actions may be commenced. Blocks 604-610 represent actions that may be begun and/or a rate at which they are repeated is increased.

At block 604, gas-environment pressure values may be measured at an increased rate. In the example of FIG. 2, the pressure sensor 206 in the gas-environment 202 may be operated at an increased rate, i.e., a rate at which pressure values are obtained is increased.

At block 606, air-environment pressure values may be measured at an increased rate. In the example of FIG. 2, the pressure sensor 208 in the air-environment 204 may be operated at an increased rate, i.e., a rate at which pressure values are obtained is increased. In an example, the actions of blocks 604 and 606 may be performed simultaneously, to create pairs of pressure values, one each from the gas-environment and the air-environment.

At block 608, pressure difference values are calculated. In an example, the pressure difference value may be calculated as the gas-environment pressure value minus the contemporaneous (i.e., measured at approximately the same time) air-environment pressure value.

At block 610, the pressure difference values may be compared to one or more threshold values. The threshold values may include: a first threshold value associated with a low gas-pressure condition; a second threshold value associated with a high gas-pressure condition; and a third threshold value associated with a high gas-pressure condition that is high enough to require that the valve 228 regulating the gas flow to the customer associated with the meter (and associated with method 600) be closed immediately.

Figure 7:
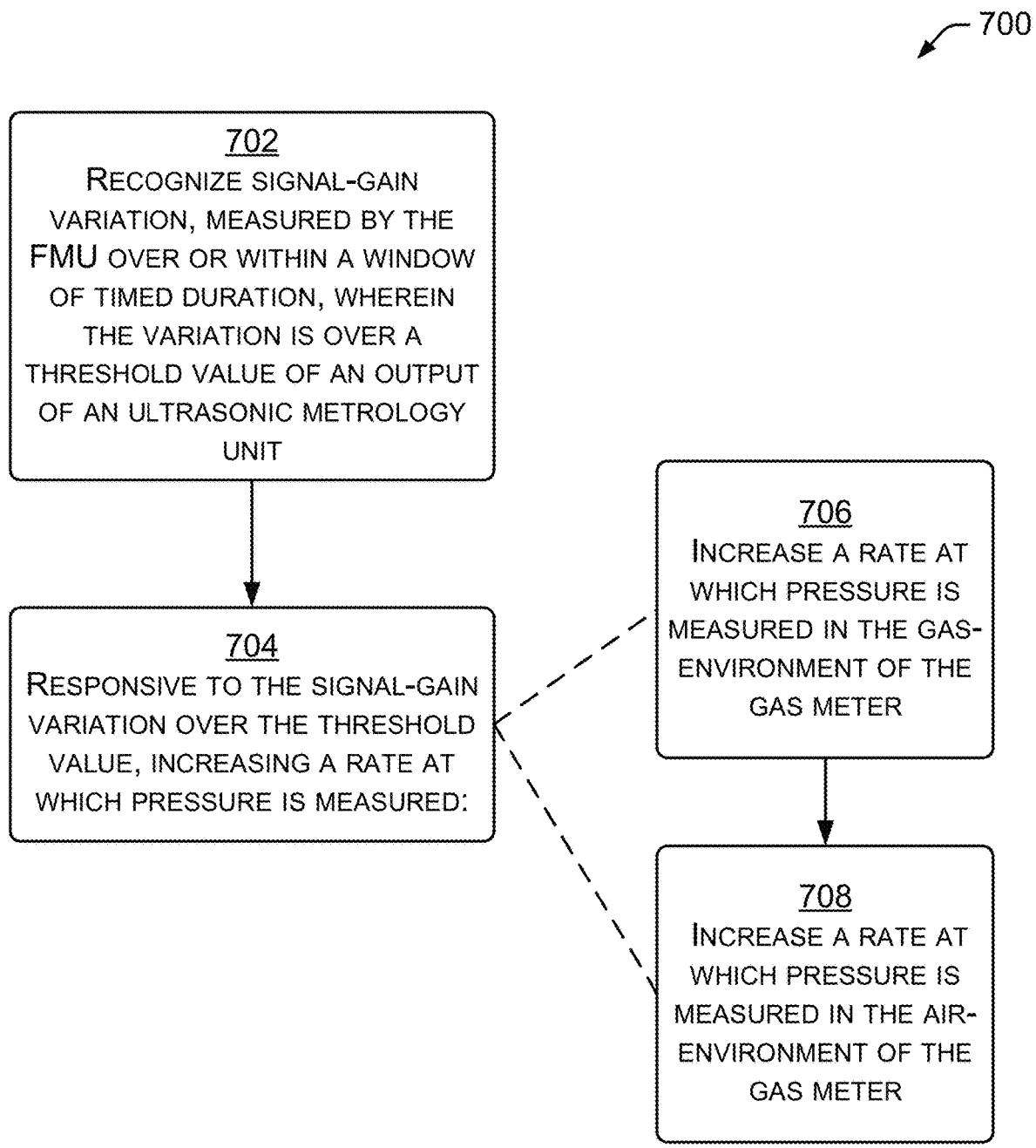
FIG. 7 is a flow diagram showing example gas meter operation, wherein responsive to signal-gain over a second threshold value at the FMU, a rate of pressure measurements is increased.

FIG. 7 shows example gas meter operation 700, wherein responsive to signal-gain over a threshold value at the FMU, a rate of pressure measurements is increased.

At block 702, signal-gain variation over a threshold value in an output of an FMU, during a window of time duration, is recognized. In the example of FIG. 2, the signal gain may be associated with an ultrasonic signal used by the FMU 212 to measure gas flowrate within a portion of the gas meter 200. In the example of FIG. 3, a rapid gain-change 304 at the FMU 212 is detected.

At block 704, responsive to the signal-gain variation over the threshold value, a rate at which pressure is measured is increased. In the example of FIG. 2, the pressure sensors 206, 208 in the gas-environment 202 and air-environment 204, respectively, are used to measure pressure at an increased rate.

Blocks 706 and 708 illustrate example techniques by which portions of block 704 may be performed. At block 706, a rate at which pressure is measured in the gas-environment of the gas meter is increased. At block 708, a rate at which pressure is measured in the air-environment of the gas meter is increased. In the example of FIG. 2, the sensors 206, 208 are used to measure pressure at an increased rate (e.g., more pressure measurements over a same period of time).

Figure 8:
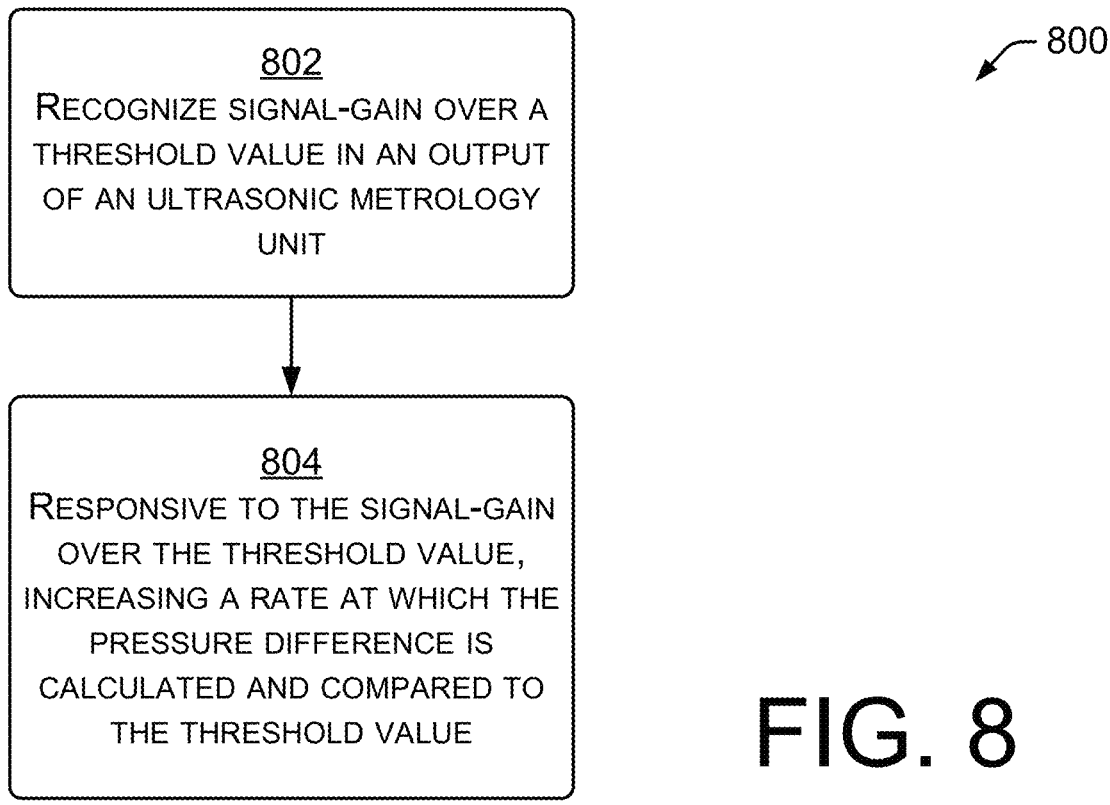
FIG. 8 is a flow diagram showing example gas meter operation, wherein responsive to signal-gain over a second threshold value at the FMU, a rate of calculations performed is increased.

FIG. 8 shows example gas meter operation 800, wherein responsive to signal-gain over a threshold value at the FMU, a rate of calculations (e.g., pressure-difference calculations and threshold-comparisons) performed is increased. At block 802, signal-gain over a threshold value in an output of an ultrasonic metrology unit is recognized. At block 804, responsive to the signal-gain over the threshold value, a rate at which the pressure difference is calculated and compared to the threshold value is increased.

Figure 9:
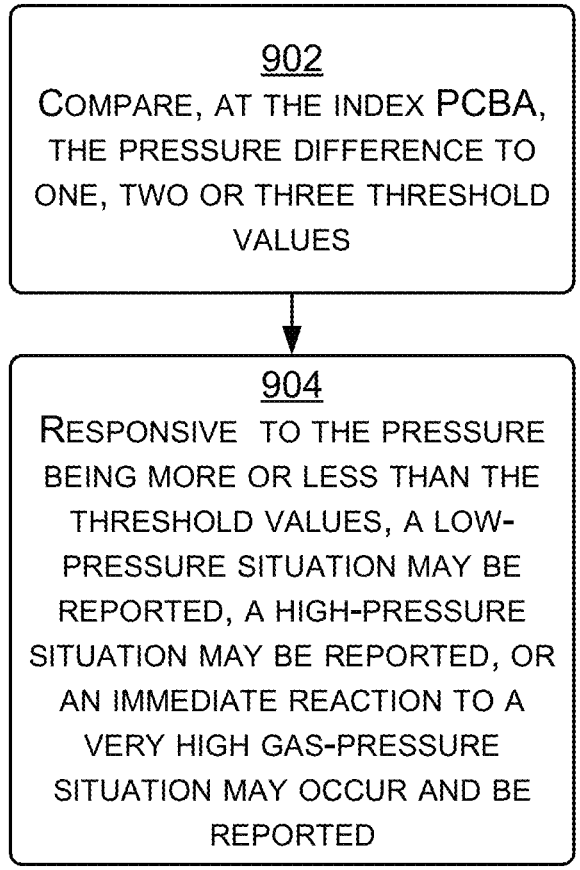
FIG. 9 is a flow diagram showing example gas meter operation, wherein the gas-environment pressure minus the air-environment pressure is compared to one or more threshold values.

FIG. 9 shows example gas meter operation 900, wherein the gas-environment pressure minus the air-environment pressure is less than a threshold value. At block 902, at the index PCBA, the pressure difference may be compared to one, two or three threshold values. At block 904, responsive to the pressure being more or less than the threshold values, a low-pressure situation may be reported, a high-pressure situation may be reported, or an immediate reaction to a very high gas-pressure situation may be performed (e.g., a valve closing) and may be reported.

Example Systems and Devices

The following examples of a metrology module adaptable for use in multiple gas meters are expressed as number clauses. While the examples illustrate a number of possible configurations and techniques, they are not meant to be an exhaustive listing of the systems and/or methods described herein.

1. A gas meter, comprising: a metrology printed circuit board assembly (PCBA) located in a gas-environment of the gas meter, wherein the metrology PCBA comprises a first pressure sensor to measure a first pressure value; and a flow measuring unit (FMU) at least partially located in the gas-environment and in communication with the metrology PCBA; an index PCBA located in an air-environment of the gas meter, wherein the index PCBA comprises: a processor; a memory device in communication with the processor; a second pressure sensor to measure a second pressure value; and commands stored in the memory device and executable by the processor to perform operations comprising: receiving, at the index PCBA, the first pressure value from the metrology PCBA; calculating a pressure difference value equal to the first pressure value minus the second pressure value; comparing the pressure difference value to a threshold value; and responsive to the pressure difference value exceeding the threshold value, performing an action.

2. The gas meter of clause 1, wherein the action comprises at least one of: closing a gas valve; sending a first message indicating a low-pressure event; sending a second message indicating a high-pressure event; sending a third message indicating gas meter tampering; and sending at least one of the first pressure value, the second pressure value, or the pressure difference value to a remote computing device.

3. The gas meter of clause 1, wherein: the first pressure sensor comprises a first micro electrical mechanical system (MEMS) and is attached to the metrology PCBA in the gas-environment; and the second pressure sensor comprises a second MEMS and is attached to the index PCBA in the air-environment.

4. The gas meter of clause 1, the operations further comprising: receiving, at the metrology PCBA, a first message from the FMU of the gas meter indicating an abnormal condition; and receiving, at the index PCBA, a second message from the metrology PCBA of the gas meter indicating the abnormal condition, wherein the calculating of the pressure difference value and comparing to the threshold value are performed in response to the second message.

5. The gas meter of clause 1, the operations further comprising: responsive to an abnormal condition at a flow measuring unit (FMU), increasing rates of: pressure measurements made at the first pressure sensor and made at the second pressure sensor; and calculations of pressure difference values and comparisons of pressure difference values to the threshold value.

6. The gas meter of clause 1, wherein the operations further comprise: responsive to a signal-gain variation, within window of a timed duration, measured by the FMU exceeding a second threshold value, performing actions comprising: increasing, by the first pressure sensor and by the second pressure sensor, a rate of pressure measurements; and increasing, by the processor, a rate of the calculating and the comparing.

7. The gas meter of clause 1, the operations further comprising: sending the second pressure value to a remote computing device.

8. A method of operating a gas meter, comprising: receiving, at an index PCBA within an air-environment of the gas meter, a first pressure value of gas pressure sent from a metrology PCBA in a gas-environment of the gas meter; measuring, at the index PCBA, a second pressure value of air pressure within the air-environment of the gas meter; calculating, at the index PCBA, a pressure difference value equal to the first pressure value minus the second pressure value; comparing, at the index PCBA, the pressure difference value to a threshold value; and responsive to the pressure difference value exceeding the threshold value, performing an action.

9. The method of clause 8, wherein performing the action comprises at least one of: sending a first message indicating a high-pressure event; closing a gas valve; sending a second message indicating a low-pressure event; sending a third message indicating tampering with the gas meter; and sending at least one of the first pressure value, the second pressure value, or the pressure difference value to a remote computing device.

10. The method of clause 8, wherein: the first pressure value was measured by a first micro electrical mechanical system (MEMS) attached to the metrology PCBA in the gas-environment; and the second pressure value was measured by a second MEMS attached to the index PCBA in the air-environment.

11. The method of clause 8, additionally comprising: responsive to an abnormal condition at a flow measuring unit (FMU), increasing rates of: measuring of gas-environment pressure values; measuring of contemporaneous air-environment pressure values; calculating pressure difference values of the gas-environment pressure values minus the contemporaneous air-environment pressure values; and comparing pressure difference values to the threshold value.

12. The method of clause 8, additionally comprising: recognizing signal-gain over a second threshold value in an output of an ultrasonic metrology unit; and responsive to the signal-gain over the second threshold value, increasing a rate at which pressure is measured: in the gas-environment of the gas meter; and in the air-environment of the gas meter.

13. The method of clause 8, additionally comprising: recognizing signal-gain over a second threshold value in an output of an ultrasonic metrology unit; and responsive to the signal-gain over the second threshold value, increasing a rate at which the pressure difference value is calculated and compared to the threshold value.

14. The method of clause 8, additionally comprising: comparing, at the index PCBA, the pressure difference value to a second threshold value; and responsive to the pressure difference value being less than the second threshold value, reporting a low-pressure situation.

15. The method of clause 8, additionally comprising: sending the second pressure value to a remote computing device.

16. A gas meter, comprising: a flow measuring unit (FMU) to measure gas flow and to transmit gas flow data; a metrology printed circuit board assembly (PCBA) located in gas-environment of the gas meter, wherein the metrology PCBA receives the gas flow data, and wherein the metrology PCBA comprises a first pressure sensor to measure a first pressure value; and an index PCBA located in an air-environment of the gas meter, wherein the index PCBA comprises a second pressure sensor to measure a second pressure value, and wherein a processor of the index PCBA is configured to perform operations comprising: calculating a pressure difference value equal to the first pressure value minus the second pressure value; comparing the pressure difference value to a threshold value; and responsive to the pressure difference value exceeding the threshold value, performing an action.

17. The gas meter of clause 16, wherein performing the action comprises: closing a gas valve; and sending a message indicating a high-pressure event.

18. The gas meter of clause 16, wherein the processor performs further operations comprising: responsive to an abnormal condition signal from the FMU, increasing at the first pressure sensor and the second pressure sensor, a rate of pressure measurements, and increasing at the index PCBA, a rate of the calculating the pressure difference value and the comparing the pressure difference value to the threshold value.

19. The gas meter of clause 16, wherein the processor performs further operations comprising: responsive to the FMU having a signal-gain variation over a second threshold value, increasing at the first pressure sensor and the second pressure sensor, a rate of pressure measurements, and increasing at the index PCBA, a rate of the calculating the pressure difference value and the comparing the pressure difference value to the threshold value.

20. The gas meter of clause 16, wherein the processor performs further operations comprising: comparing, at the index PCBA, the pressure difference value to a second threshold value; and responsive to the pressure difference value being less than the second threshold value, reporting a low-pressure situation.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A gas meter, comprising:
a metrology printed circuit board assembly (PCBA) located in a gas-environment of the gas meter, wherein the metrology PCBA comprises a first pressure sensor to make at least two gas pressure measurements, wherein a first pressure value is calculated by averaging the at least two gas pressure measurements, wherein averaging the at least two gas pressure measurements comprises:
averaging a number of gas pressure measurements, wherein the number is based at least in part on performance characteristics of a gas pressure sensor of the metrology PCBA and a barometric pressure sensor of an index PCBA;
a flow measuring unit (FMU) at least partially located in the gas-environment and in communication with the metrology PCBA; and
the index PCBA being located in an air-environment of the gas meter, wherein a bus connects the index PCBA within the air-environment and the metrology PCBA in the gas-environment, wherein the air-environment and the gas-environment are separated by a portion of an enclosure of the gas meter through which the bus passes, wherein the air-environment has a barometric pressure of atmospheric air, and wherein the index PCBA comprises:
a processor;
a memory device in communication with the processor;
a second pressure sensor to measure a second pressure value; and
commands stored in the memory device and executable by the processor to perform operations comprising:
receiving, at the index PCBA, the first pressure value from the metrology PCBA;
calculating a pressure difference value equal to the first pressure value minus the second pressure value;
comparing the pressure difference value to a threshold value; and
responsive to the pressure difference value exceeding the threshold value, performing an action.

2. The gas meter of claim 1, wherein the action comprises at least one of:
closing a gas valve;
sending a first message indicating a low-pressure event;
sending a second message indicating a high-pressure event;
sending a third message indicating gas meter tampering; and
sending at least one of the first pressure value, the second pressure value, or the pressure difference value to a remote computing device.

3. The gas meter of claim 1, wherein:
the first pressure sensor comprises a first micro electrical mechanical system (MEMS) and is attached to the metrology PCBA in the gas-environment; and
the second pressure sensor comprises a second MEMS and is attached to the index PCBA in the air-environment.

4. The gas meter of claim 1, the operations further comprising:
receiving, at the metrology PCBA, a first message from the FMU of the gas meter indicating an abnormal condition; and
receiving, at the index PCBA, a second message from the metrology PCBA of the gas meter indicating the abnormal condition,
wherein the calculating of the pressure difference value and comparing to the threshold value are performed in response to the second message.

5. The gas meter of claim 1, the operations further comprising:
responsive to an abnormal condition at the FMU, increasing rates of:
pressure measurements made at the first pressure sensor and made at the second pressure sensor; and
calculations of pressure difference values and comparisons of the pressure difference values to the threshold value.

6. The gas meter of claim 1, wherein the operations further comprise:
responsive to a signal-gain variation of an ultrasonic signal used to measure gas flowrate through the gas meter, within a window of a timed duration, measured by the FMU exceeding a second threshold value, performing actions comprising:
increasing, by the first pressure sensor and by the second pressure sensor, a rate of pressure measurements; and
increasing, by the processor, a rate of at least one of the calculating or the comparing.

7. The gas meter of claim 1, the operations further comprising:
sending the second pressure value to a remote computing device.

8. The gas meter of claim 1, wherein
the number is additionally based at least in part on a difference between a first pressure threshold below which indicates low gas pressure and a second pressure threshold above which indicates high gas pressure requiring closure of a gas shutoff valve.

9. A method of operating a gas meter, comprising:
averaging at least two gas pressure measurements made at a metrology printed circuit board assembly (PCBA) to thereby calculate a first pressure value, wherein averaging the at least two gas pressure measurements comprises:
averaging a number of gas pressure measurements, wherein the number is based at least in part on a difference between a first pressure threshold below which indicates low gas pressure and a second pressure threshold above which indicates high gas pressure requiring closure of a gas shutoff valve;
receiving, at an index PCBA within an air-environment of the gas meter, the first pressure value of gas pressure sent from the metrology PCBA in a gas-environment of the gas meter;
measuring, at the index PCBA, a second pressure value of atmospheric air pressure within the air-environment of the gas meter;
calculating, at the index PCBA, a pressure difference value equal to the first pressure value minus the second pressure value;
comparing, at the index PCBA, the pressure difference value to a threshold value; and
responsive to the pressure difference value exceeding the threshold value, performing an action.

10. The method of claim 9, wherein performing the action comprises at least one of:
sending a first message indicating a high-pressure event;
closing a gas valve;
sending a second message indicating a low-pressure event;
sending a third message indicating tampering with the gas meter; and
sending at least one of the first pressure value, the second pressure value, or the pressure difference value to a remote computing device.

11. The method of claim 9, wherein:
the first pressure value was measured by a first micro electrical mechanical system (MEMS) attached to the metrology PCBA in the gas-environment; and
the second pressure value was measured by a second MEMS attached to the index PCBA in the air-environment.

12. The method of claim 9, additionally comprising:
responsive to an abnormal condition at a flow measuring unit (FMU), increasing rates of:
measuring of gas-environment pressure values;
measuring of contemporaneous air-environment pressure values;
calculating pressure difference values of the gas-environment pressure values minus the contemporaneous air-environment pressure values; and
comparing the pressure difference values to the threshold value.

13. The method of claim 9, additionally comprising:
recognizing signal-gain of an ultrasonic signal used to measure gas flowrate through the gas meter over a second threshold value in an output of an ultrasonic metrology unit; and
responsive to the signal-gain over the second threshold value, increasing a rate at which pressure is measured:
in the gas-environment of the gas meter; and
in the air-environment of the gas meter.

14. The method of claim 9, additionally comprising:
recognizing signal-gain of an ultrasonic signal used to measure gas flowrate through the gas meter over a second threshold value in an output of an ultrasonic metrology unit; and
responsive to the signal-gain over the second threshold value, increasing a rate at which the pressure difference value is calculated and compared to the threshold value.

15. The method of claim 9, additionally comprising:
comparing, at the index PCBA, the pressure difference value to a second threshold value; and
responsive to the pressure difference value being less than the second threshold value, reporting a low-pressure situation.

16. The method of claim 9, additionally comprising:
sending the second pressure value to a remote computing device.

17. The method of claim 9, wherein
the number of gas pressure measurements is additionally based at least in part on performance characteristics of a gas pressure sensor of the metrology PCBA and a barometric pressure sensor of the index PCBA.

18. A gas meter, comprising:
a flow measuring unit (FMU) to measure gas flow and to transmit gas flow data;
a metrology printed circuit board assembly (PCBA) located in a gas-environment of the gas meter, wherein the metrology PCBA receives the gas flow data, and wherein the metrology PCBA comprises a first pressure sensor to make at least two gas pressure measurements, wherein a first pressure value is calculated by averaging the at least two gas pressure measurements, wherein averaging the at least two gas pressure measurements comprises:
averaging a number of gas pressure measurements, wherein the number is based at least in part on a difference between a first pressure threshold below which indicates low gas pressure and a second pressure threshold above which indicates high gas pressure requiring closure of a gas shutoff valve;
an index PCBA located in an air-environment of the gas meter, wherein the index PCBA comprises a second pressure sensor to measure a second pressure value; and
a bus connecting the index PCBA within the air-environment with the metrology PCBA in the gas-environment, and wherein the air-environment and the gas-environment are separated by a portion of an enclosure of the gas meter through which the bus passes;
wherein a processor of the index PCBA is configured to perform operations comprising:
calculating a pressure difference value equal to the first pressure value minus the second pressure value;
comparing the pressure difference value to a threshold value; and
responsive to the pressure difference value exceeding the threshold value, performing an action.

19. The gas meter of claim 18, wherein performing the action comprises:
closing a gas valve; and
sending a message indicating a high-pressure event.

20. The gas meter of claim 18, wherein the processor performs further operations comprising:
responsive to an abnormal condition signal from the FMU, increasing at the first pressure sensor and the second pressure sensor, a rate of pressure measurements, and increasing at the index PCBA, a rate of at least one of the calculating the pressure difference value or the comparing the pressure difference value to the threshold value.

21. The gas meter of claim 18, wherein the processor performs further operations comprising:
responsive to the FMU having a signal-gain variation over a second threshold value, increasing at the first pressure sensor and the second pressure sensor, a rate of pressure measurements, and increasing at the index PCBA, a rate of the calculating the pressure difference value and the comparing the pressure difference value to the threshold value.

22. The gas meter of claim 18, wherein the processor performs further operations comprising:
comparing, at the index PCBA, the pressure difference value to a second threshold value; and
responsive to the pressure difference value being less than the second threshold value, reporting a low-pressure situation.

23. The gas meter of claim 18, wherein
the number of gas pressure measurements is based at least in part on performance characteristics of a gas pressure sensor of the metrology PCBA and a barometric pressure sensor of the index PCBA.

* * * * *